Aug. 1, 1967   W. J. DENKOWSKI   3,333,477
INPUT END STOP MECHANISM
Filed Oct. 4, 1965   4 Sheets-Sheet 2
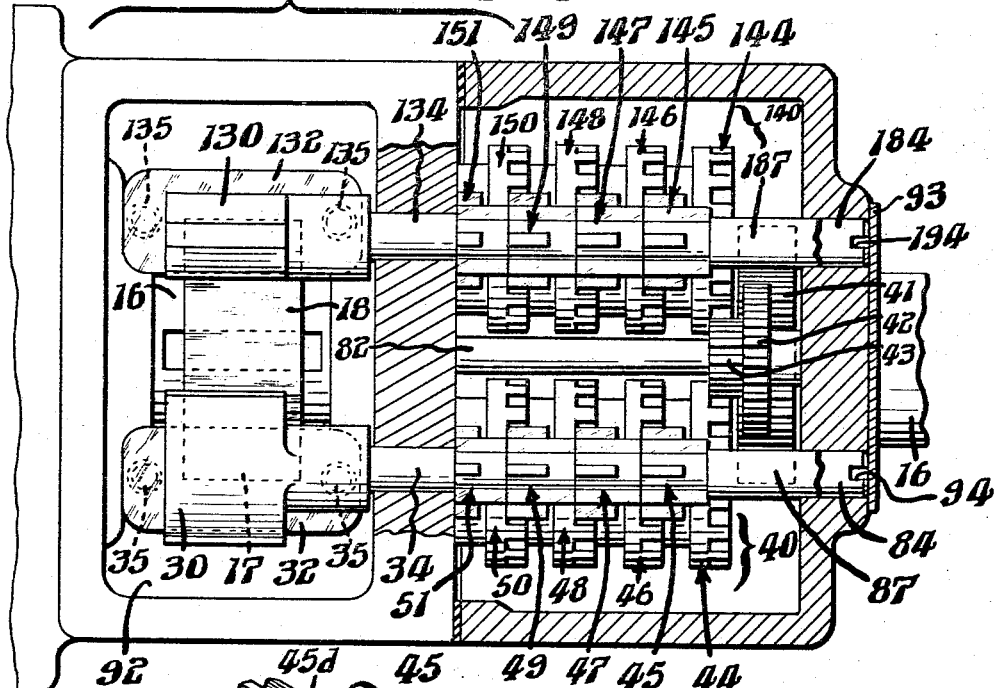
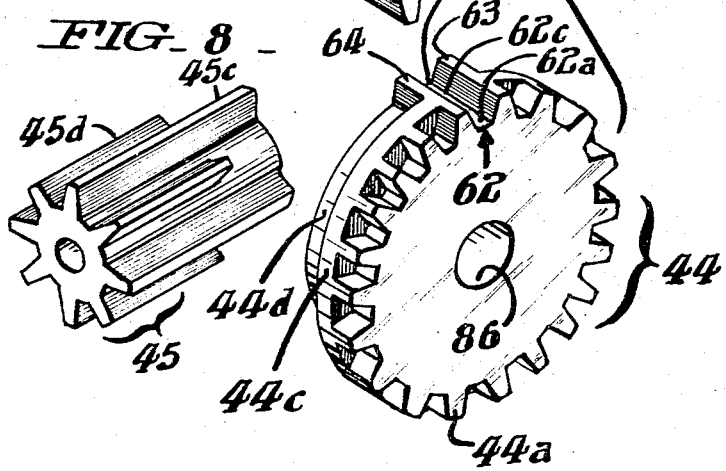
INVENTOR.
Walter J. Denkowski,
BY
Paul & Paul
ATTORNEYS.

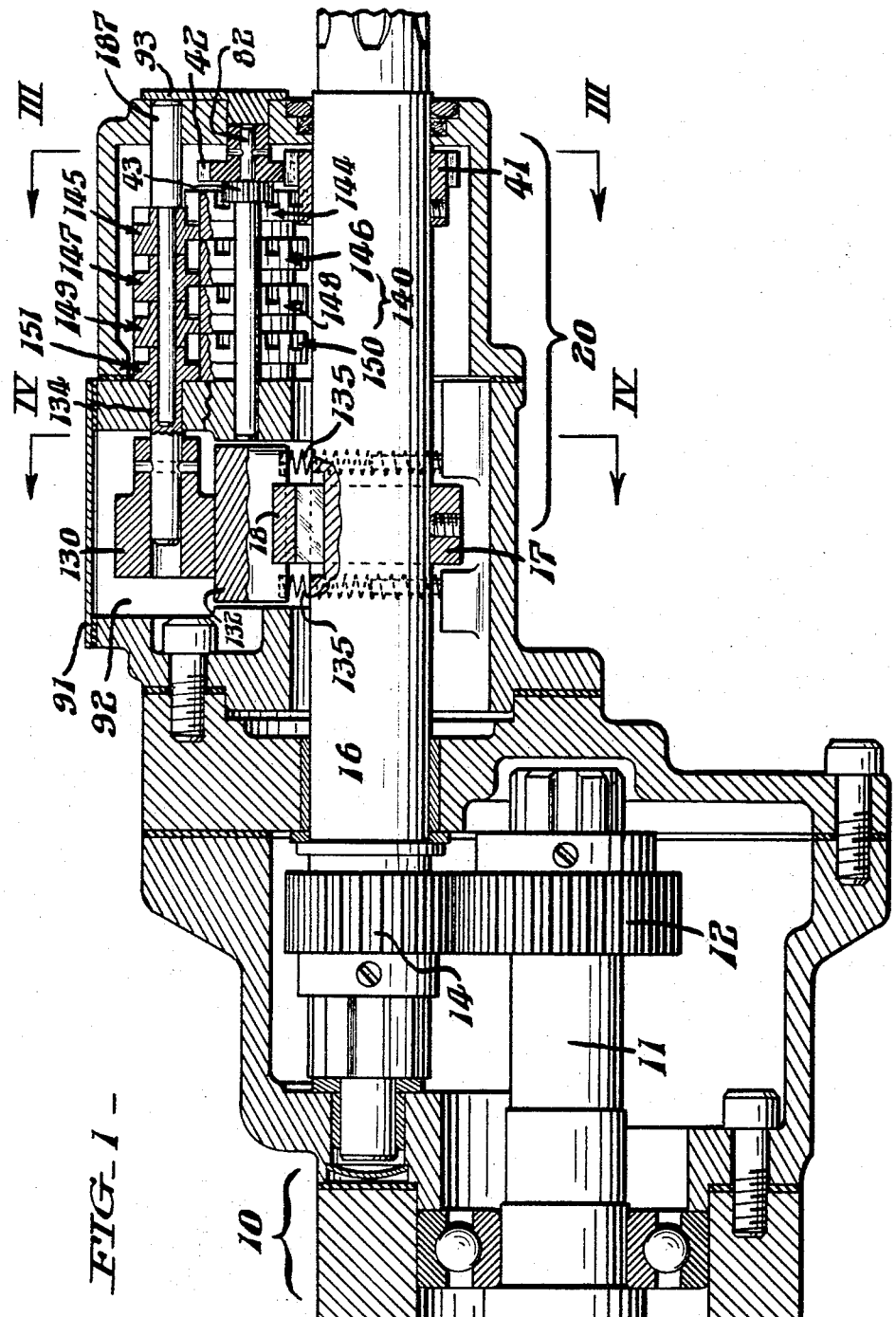

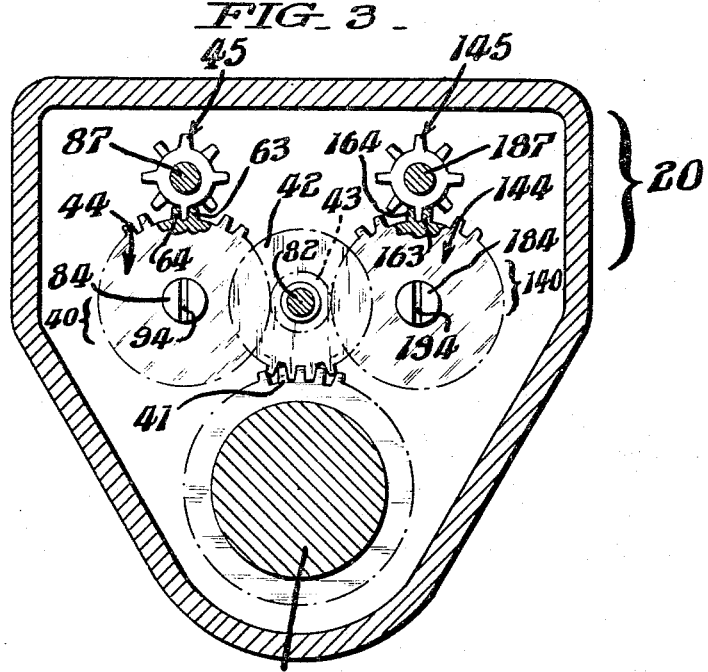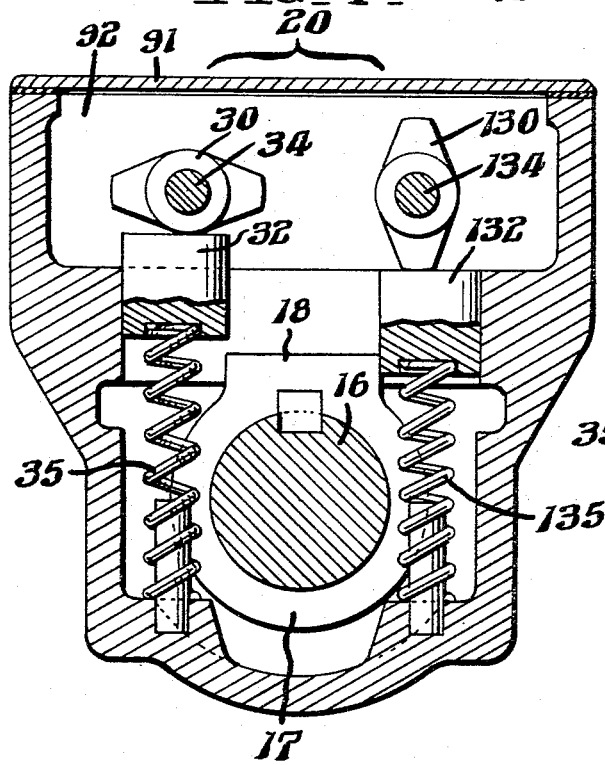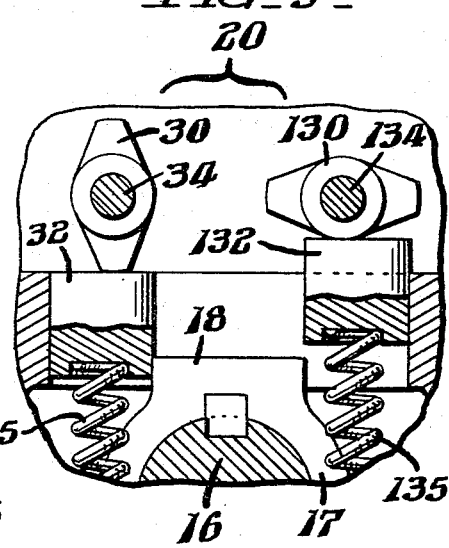

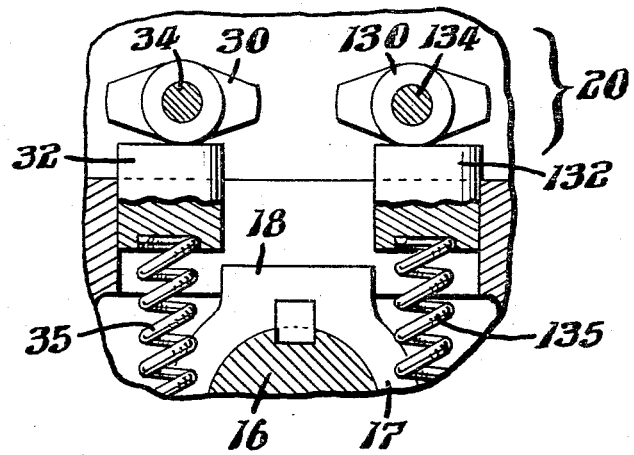
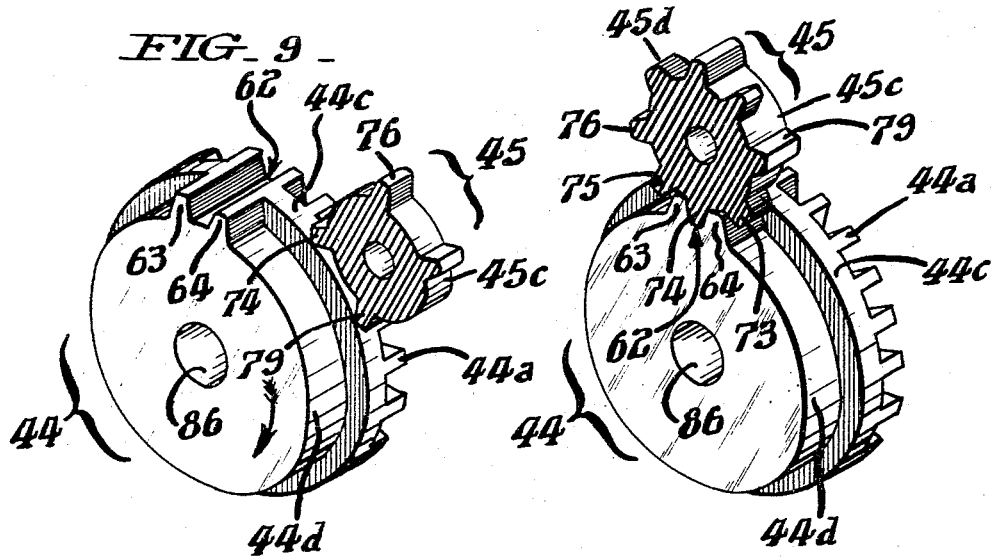

United States Patent Office 3,333,477
Patented Aug. 1, 1967

3,333,477
INPUT END STOP MECHANISM
Walter J. Denkowski, King of Prussia, Pa., assignor to King of Prussia Research and Development Corporation, King of Prussia, Pa., a corporation of Pennsylvania
Filed Oct. 4, 1965, Ser. No. 492,495
11 Claims. (Cl. 74—10.2)

This invention relates to a limit stop mechanism for protecting a driven device from stress by stopping positively an input rotating member, such as a shaft, after a limited number of revolutions.

The limit stop mechanism of the present invention is connected to the drive at the input end. The drive may be either power or manual. The driven device which is to be protected may be a rotary device, such as a gate valve, or may be a linear device, such as a screw jack. These are merely two examples of a wide variety of devices which may be protected by the stop mechanism of the invention.

The limit stop mechanism of the present invention, when used to protect a rotary output device, such as a rotary valve or gate, avoids over-torquing which might otherwise damage the driven equipment. When used to protect a linear output device, such as a travelling nut, use of the invention avoids any possibility of jamming the travelling nut.

The limit stop of the present invention is completely adjustable within the range of the equipment to be protected. When properly adjusted, there is no stress on any of the driven parts beyond the limit stop mechanism, the stress area being limited solely to the limit stop mechanism.

In order that the invention may be clearly understood, a preferred embodiment is illustrated and described, but it is to be understood that this embodiment is given by way of example only and the many modifications may be possible to suit special conditions.

In the drawing:

FIG. 1 is a side elevational view, in section, of one form of limit stop mechanism according to the present invention, applied to an input shaft, which may, for example, be used to drive a valve operator;

FIG. 2 is a plan view, in section of the limit stop mechanism of FIG. 1;

FIG. 3 is an end view, in section looking along the line III—III of FIG. 1 in the direction of the arrows;

FIG. 4 is an end view, in section, looking along the line IV—IV of FIG. 1 in the direction of the arrows;

FIG. 5 is similar to a portion of FIG. 4, but shows the cams and stop keys in reversed operative positions;

FIG. 6 is similar to FIG. 5, but shows the cams and stop keys in normal positions;

FIG. 7 is an exploded perspective view of one set of gears of the multi-set gear trains;

FIG. 8 is a perspective view looking at the other end of the pinion of FIG. 7; and FIGS. 9 and 10 are perspective views, partly broken away, to show the engagement between the two-tooth disc section of the main gear of the gear train and the pinion.

General description

In FIG. 1, reference numeral 10 represents a fragmentary portion of some sort of device which may be any of the large variety of devices but which for convenience in describing the present invention will be assumed to be a valve operator. Thus, in FIG. 1, reference numeral 10 will be assumed to identify a valve operator having a drive shaft 11 whose function is to drive a valve stem (not shown) in one direction to open the valve (not shown) and in the opposite direction to close the valve. Drive shaft 11 is adapted to be coupled to an input shaft 16 through suitable gearing, such as represented in FIG. 1 by gears 12 and 14.

Reference numeral 20 identifies the limit stop mechanism of the invention driven by input shaft 16 and having as its purpose or function the protecting of the valve operator 10, and the valve which it drives, from stress and possible damage due to continued application of input torque after the valve has reached fully closed or fully open position. Mechanism 20 achieves its purpose by providing positive stops to limit input shaft 16 to operation between first and second limit positions. To move between these limit positions, requires a predetermined number of revolutions of the shaft 16, after which the mechanism 20 provides a positive stop against further rotation of shaft 16. The number of revolutions of shaft 16 required to move between the limit positions is adjustable within wide ranges.

So far as the limit stop mechanism is concerned, the limit positions need not correspond to the fully closed nor fully opened positions of the valve or other device to be protected. For example, the limit stop mechanism may be adapted to stop the input drive before the valve is fully closed or fully opened. Moreover, this adjustment may be made at any time, without dismantling or removing either the stop mechanism or the device being protected.

To facilitate a general description, assume that the limit stop mechanism is set up so that it requires 1000 revolutions of input shaft 16 to move from the first to the second limit position, and vice versa. Assuming starting at one of the limit positions, then, upon the completion of 1000 revolutions of input shaft 16, a positive stop is met. This stop is provided by a radial projection or stop plug 18 on a collar 17 which is keyed to shaft 16 at an intermediate position.

During the time that shaft 16 is being rotated from one limit position to the other, cams 30 and 130 are in their normal (horizontal) positions, as shown in FIG. 6, and stop keys 32 and 132 are both in their normal UP positions, being biased UP by the two pairs of compression springs 35 and 135 against the cams 30 and 130. The pair of springs 35 supports the key 32 at its opposite ends (FIG. 2), while the pair of springs 135 supports key 132 at its opposite ends. With keys 32 and 132 both in the UP positions, as seen in FIG. 6, the projection or stop lug 18 of collar 17 clears both of the stop keys 32 and 132, and input shaft 16 may be driven rotationally in either direction.

The limit stop mechanism of the present invention is, however, so constructed and arranged that when input shaft 16 completes the required number of revolutions, in the present example 1000, one of the cams, 30 or 130, depending on the direction of rotation of shaft 16, is turned through 90° and assumes a vertical position, such as indicated by cam 130 in FIG. 4, and by cam 30 in FIG. 5. When the cam 130, or 30, is turned to the vertical position, the stop key 132, or 32, is depressed to its DOWN position against the action of its pair of biasing springs. When this occurs, the sidewall portion of the projecting lug 18 of collar 17 will, during rotation, come into abutting engagement with the sidewall portion of the depressed key, and, since collar 17 is keyed to input shaft 16, shaft 16 will be prevented from further rotation.

Assuming that the limit stop mechanism 20 is connected to protect a valve operator, and is properly adjusted, when input shaft 16 is stopped by the positive engagement of lug 18 abutting against the key 132, the valve is in, for example, the fully closed position. Any further input torque which may be applied to the input shaft 16 is prevented, by the stop limit mechanism, from reaching the remainder of the valve operator or from reaching the valve itself. Thus, the valve operator and valve are relieved of any stress which might otherwise occur through input over-torquing.

When the valve is to be opened, input shaft 16 is rotated in the opposite direction, counterclockwise in the present example, as viewed in FIGS. 4, 5 and 6. The limit stop mechanism is so arranged that, after a cam, such as cam 130, has been turned to its vertical position, thereby to depress the stop key, rotation of shaft 16 one revolution in the opposite direction will return the cam to its normal horizontal position. This action releases the mechanism, placing it in such state that shaft 16 may be driven rotationally in the said opposite direction the selected number of revolutions before lug 18 of collar 17 will come into abutting engagement with key 32.

*Detailed description of limit stop mechanism*

Fixed to input shaft 16 is a gear 41 adapted to mesh with a gear 42 fixed to a shaft 82 supported for rotation about an axis located above and parallel with the axis of shaft 16. Shaft 82 lies in the same vertical plane as shaft 16 (FIG. 3). Fixed to shaft 82 is a pinion 43 which meshes with each of two gears 44 and 144 located to either side of pinion 43. Gears 44 and 144 are fixed to shafts 84 and 184, respectively, mounted for rotation on axes located in the same horizontal plane as shaft 82, and to either side thereof.

Gears 44 and 144 are identical in form, and it will be necessary to describe but one of them. Gear 44 will be described. Gear 44 is shown most clearly in FIGS. 7 9 and 10. While preferably an integral structure, it will be convenient to consider gear 44 as having three sections, each concentric about a common bore 86 for receiving shaft 84. The first section of gear 44, is a spur gear 44a having, in the illustrated embodiment, 20 teeth. The second section is a take-along disc 44c having but a single groove 62c in its periphery which is in alignment with the valley 62a between two teeth of gear 44a. The disc 44c has a major diameter equal to that of the gear 44a. The third section is a disc 44d having two teeth 63 and 64 protruding from its minor diameter. The valley 62d between the teeth 63, 64 is in alignment with the single groove 62c in the disc 44c and the valley 62a, thereby forming a groove 62 which extends the full width of the gear 44. The major diameter of disc 44 is equal to the major diameter of the disc 44c, and the minor diameter of disc 44d is equal to the minor diameter of the disc 44a.

Meshing with the discs 44c and 44d is a step-tooth pinion 45 which, while formed in one integral piece, may be considered as being comprised of two coaxially adjacent pinions, one a four-tooth pinion 45c adapted to span disc 44c, and the other an eight-tooth pinion 45d adapted to mesh with the two-tooth disc 44d and with section 46a of the next adjacent gear 46 in the multi-set train of gears shown in FIGS. 1 and 2. The pinion 45, considered as an integral entity, may be looked upon as having alternate long and short teeth, the short teeth being formed by cutting away end portions of alternate teeth to form the 4-tooth pinion 45c.

When pinion 45 is not rotating, two long teeth span the disc 44c. When pinion 45 rotates, one of the long teeth is received into a portion of the groove 62, namely, portions 62c, 62d. When pinion 45 is not rotating, one of the short teeth rides above disc 44d. The positional relationship of pinion 45 to the gear 44 is such that when the teeth 63 and 64 of the two-tooth disc 44d are not in engagement with the teeth of pinion 45d, the disc 44c and 44d are free to move rotationally without driving the pinion rotationally. This condition is illustrated in FIG. 9. The circular edge of disc 44c slides by the sides of two of the four teeth of pinion 45c, being teeth 74 and 79 as illustrated in FIG. 9, and the circular edge of disc 44d slides by the tip of tooth 73. Tooth 73 is that one of the short teeth of pinion 45d which is located between the long teeth 74 and 79. The latter condition is not visible in FIG. 9 since pinion 45 is cut away to show the relationship between the teeth 74, 79 of pinion 45c and the disc 44c.

No rotation is imparted to the step-toothed pinion 45 until, in FIG. 9, the short tooth 73, the tip of which has been sliding by above the smooth periphery of disc 44d, is engaged by the front-running tooth 64 of disc 44d, assuming the direction of rotation to be clockwise, as indicated in FIG. 9 by the arrow. When this occurs, the pinions 45d and 45c, being integral, are moved rotationally counterclockwise, and the long tooth 74, which is common to both pinions 45c and 45d, is moved into the groove 62 of gear 44 and occupies the portions 62c, 62d. This condition is illustrated in FIG. 10. Then, as gear 44 continues its rotational movement, the rear-runing tooth 63 of the disc 44d moves against the tooth 74 and causes the pinion 45 to continue its rotational movement in the counterclockwise direction until the short tooth 75 of the pinion 45d takes up the position previously occupied by tooth 73, with its tip sliding by above the periphery of disc 44d. In this position, long tooth 74 occupies the position previously occupied by long tooth 79 while long tooth 76 occupies the position previously occupied by long tooth 74. Thus, the two long teeth 74 and 76 now span the circular edge of the section 44c, while the tip of the short tooth 75 slides by above the circular edge of the section 44d.

It will be seen, then, that the pinion 45 has been rotated through 90° by the action just described. The gear 44 is now free to continue its rotational movement in the same direction of rotation without further driving of the step-toothed pinion 45 until the disc 44d completes another revolution and the tooth 64 of disc 44d again comes into engagement with one of the short teeth of pinion 45d, in this example, tooth 75. The action above described is then repeated. It will be seen then that for each revolution of gear 44, the pinion 45 is rotated through 90°. Thus, it requires four revolutions of the gear 44 to achieve one revolution of the pinion 45.

The end portion of the 8-tooth pinion 45d which is remote from the 4-tooth pinion 45c meshes with a gear 46 whose construction is identical to that of gear 44, just described, and the two-tooth disc of gear 46, corresponding to section 44d of gear 44, is adapted to mesh with a pinion 47 which is identical in construction to pinion 45.

In the limit stop mechanism 20 selected for illustration, the gear train 40 is shown in FIG. 2 as having four sets of gears similar to the set comprising gear 44 and pinion 45, all four sets being supported on shafts 84 and 87 (FIG. 3). The three additional sets in train 40 are identified as 46–47, 48–49, and 50–51.

An identical gear train 140 supported on shafts 184 and 187, and comprising gear 144, pinion 145, etc., is provided on the opposite side of shaft 82. Gear train 140 is seen in FIGS. 1, 2 and 3.

The last set of gears in each of the trains 40 and 140 is different in that its pinion, as shown by pinion 151 of train 140 in FIG. 1, is provided with an elongated shaft 134 having a bore at the near end for receiving the shaft 187. To the outward end of shaft 134 the stop cam 130 is fixed. Thus, when pinion 151 is rotated through 90°, the cam 130 is rotated through 90°. The same applies to train 40.

Gear train 40 of FIG. 1 is effective after, for example, 1,000 revolutions of input shaft 16 from a starting limit position, to drive the shaft 34 of pinion 51 through 90°, thereby turning the cam 30 from its normal horizontal position, shown in FIG. 6, to the vertical position shown in FIG. 5.

The reduction effect of each of the gear trains 40 and 140 may be briefly explained by assuming that gear 41

(which is fixed to input shaft 16) has forty teeth, that gear 42 has twenty teeth, that pinion 43 has ten teeth, that, for gear train 40, the first sections (such as 44a) of each of the gears 44, 46, 48 and 50 have twenty teeth, that the fourth sections (such as 44d) of each of these gears have two teeth, and that the pinions 45, 47, 49 and 51 each have four-teeth and eight-teeth sections as illustrated and described with respect to pinion 45. In such a gear train, a simple calculation will show that it would require 1,000 revolutions of imput shaft 16 from a starting limit position before shaft 34 of cam 30 would be rotated through 90°.

*Setting up the limit stop mechanism*

The procedure for setting up the limit stop mechanism 20 may be briefly described as follows:

The top cover plate 91 of well 92 is removed to reveal the cams 30 and 130 so that their positions may be observed. End plate 93 is removed and shaft 82 is pushed to the right (as viewed in FIGS. 1 and 2) to disengage gear 43 from gears 44 and 144. Input shaft 16 is then turned, preferably manually, until the device which is being controlled has reached one of its desired limit positions. In the present discussion, the device is assumed to be a valve, and the limit position desired may be assumed to be the fully open position of the valve, and shaft 16 may be assumed to be rotated in the counter-clockwise direction as viewed in FIGS. 3–6, to attain the open position. Shaft 16 is then backed off, i.e. turned in the opposite or clockwise direction, for a portion of one turn, sufficiently to locate the stop lug 18 at the bottom of shaft 16, i.e., 180° from its operative position as a stop lug. The position of lug 18 is viewed by the operator through the open top of well 92. A screwdriver is inserted in the slot 94 at the end of shaft 84. Shaft 84 is turned counter-clockwise, in the present example, until the gear train 40 actuates the cam 30, turning it from its normal horizontal position shown in FIG. 6 to the vertical position shown in FIG. 5 in which it depresses its associated stop key 32 to the DOWN position. This action is viewed by the operator through the opening in the top of well 92. Input shaft 16 is then rotated counter-clockwise a portion of one turn until stop lug 18 abuts against the side wall of the depressed key 32, as illustrated in FIG. 5.

Shaft 82 is now pushed inwardly, to the left as viewed in FIG. 1, to re-engage gear 43 with gears 44 and 144. Input shaft 16 is now turned in the opposite direction, i.e., clockwise in the present discussion, to change the device being controlled to its other limit position, the closed position of the valve in the present example. It is to be noted that as soon as shaft 16 is turned in the opposite or clockwise direction for a portion of one revolution, cam 30 is returned to its normal horizontal position, and the depressed stop key 32 returns to the UP position. This is because the last pinion 51 in the gear train 40 is immediately actuated by the two-tooth disc 50d. Thereafter, as shaft 16 continues to be turned, the gear train 40 retreats from the open-valve limit position.

When the valve is fully closed, input shaft 16 is backed off to locate stop lug 18 at the bottom of the shaft. Gear 43 is then again disengaged from gears 44 and 144, a screw driver is inserted in the slot 194 in the end of the shaft 184, and shaft 184 is rotated in the clockwise direction until the cam 130 is moved from its normal horizontal position to its vertical position, shown in FIG. 4, and key 132 is depressed to its DOWN position. This is observed through the opening created by the removal of top cover plate 91. Shaft 16 is then rotated clockwise for a portion of a turn until the projecting stop lug 18 abuts against the sidewall of the depressed stop key 132, as illustrated in FIG. 4. Gear 43 is then re-engaged with the gears 44 and 144.

The stop limit mechanism 20 is now properly set to control the valve operator 10 by providing a positive stop at each end of its desired travel, namely, at the open and closed positions of the valve. That this is so, will be evident from the following brief consideration. Assume that input shaft 16 is rotated counter-clockwise, starting at the position last described above in which the valve was fully closed. Gear train 40, comprising the four sets of gears supported on shafts 84 and 87, will be actuated by the same number of revolutions of shaft 16 but in an opposite direction relative to that through which it was actuated by shaft 16 in coming from the open position of the valve to the closed position of the valve. It follows then that at the end of that number of revolutions of input shaft 16, the last gear in the train, namely, pinion 51, will be turned through 90°, thereby turning the cam 30 from its normal horizontal position shown in FIG. 6 to the vertical position shown in FIG. 5, thereby depressing stop key 32, and thereby providing a positive stop for the stop lug 18, thus preventing further rotation of input shaft 16.

It likewise follows that as input shaft 16 is rotated in the opposite or clockwise direction to move the valve from the open to the closed position, the other gear train, namely, gear train 140 comprising the four sets of gears on the shafts 184 and 187 will be actuated by the same number of revolutions of shaft 16 but in the opposite direction relative to that through which it was actuated in proceeding from the closed to the open position of the valve. Thus, at the end of that number of revolutions of input shaft 16, the last gear in the train 140, namely, pinion 151, will be turned through 90°, and the cam 130 will be turned from the horizontal position, shown in FIG. 6, to the vertical position shown in FIG. 4, thereby depressing the stop key 132, and thus providing a positive stop against further rotation of the input shaft 16.

It will be understood that by varying the number of sets or pair of gears in the gear trains, and by varying the gear ratios, as, for example, the number of teeth on the first sections of the gears corresponding to gears 44, 144, the number of revolutions of input shaft 16 required to move the controlled device between its limit positions may be adjusted within wide limits. Moreover, within the range of the particular gear trains, the stop limits may be readily adjusted at any time without removing the gear trains or the device being protected.

In FIG. 1 of the drawings, the stop limit mechanism, located to the right of gears 12, 14, is shown to be contained within a two-piece housing. It will be understood that the housing can be designed to accept different numbers of gear sets in the gear trains.

As mentioned previously, the limit stop mechanism of the present invention is also applicable to linear devices, in which case the positive abutting action of the stop mechanism avoids jamming the equipment. For example, the limit stop mechanism can be employed to stop the drive of a travelling nut before the nut jams.

In the gear sets of the gear train described and illustrated, the pinion 45 is locked against rotation for most of the rotation of the gear 44 by the spanning of two of the teeth of the pinion across the surface of the disc 44c, as is illustrated in FIG. 9 by the teeth 74 and 79. It should be understood that, so far as the present invention is concerned, the intermittent gears could be locked by other means, for example, by friction means or Geneva movement.

While the preferred embodiment of this invention has been described in some detail, it will be obvious to one skilled in the art that various modifications may be made without departing from the invention as hereinafter claimed.

Having described my invention, I claim:

1. A positive limit stop mechanism for protecting equipment against excessive input force, comprising, in combination, a rotatable input shaft; a projection fixed to and projecting radially from said input shaft; first and second stop surfaces adjacent said input shaft at the location of said shaft projection; biasing means for maintaining each of said stop surfaces normally in a position outside the path of rotation of said shaft projection; first and second cams respectively engaging said first and second stop surfaces, each of said cams in normal position allowing the biasing means to maintain the cam-engaged stop surface outside the path of said projection; first and second connecting means connected between said input shaft and said first and second cams respectively for moving the associated cam, in response to rotations of said input shaft within the range of the connecting means to move the associated stop surface against the action of the biasing means into the path of said projection.

2. Apparatus as claimed in claim 1 further characterized in that said biasing means comprise springs.

3. Apparatus as claimed in claim 2 characterized in that said springs support each stop surface in an UP position.

4. Apparatus as claimed in claim 3 further characterized in that said cams are mounted above and in contact with said stop surfaces, and when in said normal positions allow said stop surfaces to remain in their UP positions.

5. Apparatus as claimed in claim 4 characterized in that said connecting means are gear trains.

6. Apparatus as claimed in claim 5 characterized in that said first gear train is connected to move the first cam in response to a number of rotations of said input shaft in one direction, and said second gear train is connected to move the second cam after a corresponding number of rotations of said input shaft in the opposite direction.

7. Apparatus as claimed in claim 6 further characterized in that each of said gear trains includes at least one set of gears in which the driven gear is a pinion and the driving gear is an interrupted gear.

8. Apparatus as claimed in claim 7 further characterized in that each of said gear trains includes a plurality of sets of gears connected in series, and in which the pinion of the last set is connected to the cam.

9. Apparatus as claimed in claim 8 further characterized in that said pinion has a set number of teeth to drive said pinion one-quarter of a complete revolution for each full rotation of said interrupted gear.

10. Apparatus as claimed in claim 9 further characterized in that the pinion of the last set of gears in the series is provided with a shaft, and in that one of said cams is fixed to said pinion shaft, whereby when said pinion is turned one-quarter of a turn, said cam is turned through 90°.

11. Apparatus as claimed in claim 10 further characterized in that the radial projection fixed to said input shaft is a projection on a collar which is fixed to said input shaft.

References Cited

UNITED STATES PATENTS 3,232,124   2/1966   Weber _____ 74—10.2

MILTON KAUFMAN, *Primary Examiner.*